Patented Apr. 18, 1939

2,155,086

UNITED STATES PATENT OFFICE 2,155,086

ELECTROLYTE

Alexander M. Georgiev, Dayton, Ohio, assignor to General Motors Corporation, Detroit, Mich., a corporation of Delaware No Drawing. Application May 9, 1936, Serial No. 78,851

12 Claims. (Cl. 175—315)

This invention relates to electrolytes for electrolytic cells such as electrolytic condensers, rectifiers and the like. While not at all limited thereto, the electrolyte of this invention is particularly adapted for use in aluminum electrode condensers, that have a dielectric film formed on the electrodes, and especially in those condensers of the so called dry type, in which the electrolyte is substantially absorbed by a porous or absorbent material, the latter serving as a spacer between the electrodes as well as a carrier for the electrolyte.

A high grade electrolyte used in electrolytic condensers must meet the following requirements:

(1) The electrolyte should have no deteriorating or corrosive effect upon any of the parts of the unit, or the container therefor, with which the electrolyte comes in contact.

(2) The electrolyte should be an effective film-forming and film-maintaining agent.

(3) The electrolyte should be substantially permanent in its chemical constitution and physical properties, insofar that it should not be apt to decompose under operating conditions, and should not exhibit precipitation or stratification or undergo other changes.

(4) The electrical resistance of the electrolyte should be high enough to insure the required safe breakdown voltage of the protective film. On the other hand the resistance should not exceed a value above which the electrical losses tend to become objectionable, and would affect the efficiency of the cell.

(5) The electrolyte should have good wetting properties so that it will readily penetrate into the pores and interstices of the spacer, which facilitates impregnation and provides for thorough covering of the electrodes.

(6) The properties of the electrolyte should be such, that the cell within which it is used will meet the specific operating requirements, as to the capacity, power factor, leakage current, breakdown voltage, expected temperature and other factors incident to operation.

(7) The condenser should maintain its initial capacity and power factor in the course of storage and use.

An object of this invention, therefore, is to provide an electrolyte suitable for electrolytic condensers, rectifiers and the like, that is characterized by, and that will insure each and all of the several recited desirable qualities.

A further object of this invention is to provide an electrolyte that utilizes materials relatively reactive, so as to readily produce a reaction product that is a completely homogeneous and mobile liquid, nearly neutral in character, and devoid of any substantial water content.

It is another object of this invention to provide an electrolyte characterized by a minimum tendency to precipitate out, and/or to stratify, but remains substantially uniform in character throughout the cell.

Another object of this invention is to provide an electrolyte that is sufficiently conductive although substantially devoid of water.

Another object is to provide an electrolyte that is easily and economically manufactured, and conveniently handled and stored.

Another object of the invention is to provide an electrolyte that is substantially stable physically and chemically, under a wide range of operating conditions, and over a wide range of ionogen concentrations.

Another object of the invention is to provide an electrolyte that has good film-forming and film-maintaining qualities, and that has no corrosive or deteriorating effect upon the parts of the containing cell.

Another object of the invention is to provide an electrolyte that is a completely mobile liquid at normal and even at rather low temperatures, even though a large percentage of the ionogen be present, whereby impregnation of absorbent spacer cell units can be readily accomplished without the usual high temperature heat treatment.

Still a further object of the invention is to provide an electrolyte that is devoid of gum forming qualities, and that will not harden or solidify during long use, or under severe operating conditions.

Further objects and advantages of the present invention will be apparent from the following description, wherein a preferred embodiment of the present invention is clearly described.

An electrolyte found to be characterized by each and all of these desirable characteristics, and found to be the answer to the above objects, is one whose constituents include one or more of the various amines and acetic acid, preferably glacial acetic acid or acetic anhydride whose reaction product is practically free from water.

It has been found that the amines as such, though being substantially chemically reactive, and of a pronounced basic reaction, are of little value alone as electrolytes in electrolytic condensers, one reason being their excessively high specific resistance. The marked alkaline reaction of the amines, furthermore may result in corrosion or deterioration of the component parts of the device. The use of amines, without the addition of other ingredients, is therefore impractical because of increased cost, attack on component parts and lowered efficiency. When the ethanolamines are used alone as electrolytes, they are apt to freeze or solidify at moderately low temperatures. It has also been found that as a solvent for an ionogen like a borate or acetate, that the amines are satisfactory, but in this respect, due to their greater cost, the amines do not offer any advantage over glycerine for instance, the latter being much cheaper.

However, it is established that the amines, when used as liquid reactants in conjunction with acetic acid, practically free from water, prove to be very desirable in the preparation of a fluid or completely mobile liquid electrolyte for an electrolytic condenser. Particularly good results are obtained when amines are used in conjunction with glacial acetic acid or acetic anhydride. A variety of amines and their mixtures have been made use of in this connection, and include diamylamine, monoamylamine, monoethanolamine, diethanolamine and triethanolamine.

Particularly satisfactory electrolytes are formed when the reaction product is the result of glacial acetic acid reacting with either diethanolamine or triethanolamine alone, or their mixture. It is sometimes desirable to regulate the viscosity of the resulting electrolyte liquid by adding the proper amount of monoethanolamine.

While the preferred reaction product is that resulting from the reaction of glacial acetic acid upon diethanolamine or triethanolamine, various amines can be used for the preparation of an electrolyte.

Also, wide limits in proportions, acidity, viscosity and conductivity are permissible without material deviation from the desirable qualities hereinabove set forth. The choice of the amine, the proportions of the ingredients, the particular acidity and conductivity etc., of the reaction product, will depend upon the type of condensers in which the electrolyte is to be incorporated, its construction, voltage rating and other operating requirements. It has been found that for electrolytic condensers used in starting a single phase motor at an 110 volts A. C., particularly good results are obtained when either diethanolamine or triethanolamine, or their mixture, is used in conjunction with glacial acetic acid. If it is desired to lower the viscosity of the reaction product, monoethanolamine may be admixed with either diethanolamine or triethanolamine without materially altering the characteristics.

It has also been found that a further improvement in the performance of the electrolytic condenser is brought about if a moderate percentage of diacetone alcohol (preferably acetone free) is added to the electrolyte. The percent of the addition is not critical, but about 20% of the total weight of the electrolyte composition is very suitable. The good effect from this addition outside of the regulation of the viscosity, is the steadiness in capacity and power factor of the condenser in use, and its longer life, particularly under adverse operating conditions.

In a separate application the use of diacetone alcohol in conjunction with the electrolytic condensers in general will be broadly claimed. In the instance of this particular electrolyte however, a very desirable method of using diacetone alcohol consists in soaking of the pre-wound or otherwise assembled porous spacer built electrolytic condensers in pure diacetone alcohol, preferably acetone free. The condenser sections are left in the diacetone alcohol until their porous spacers are thoroughly wetted therewith. Usually, one to two hours of soaking at room temperature are sufficient for the purpose. The condenser sections are then removed from the diacetone alcohol, drained for about 10 minutes and then subjected to the ordinary impregnating process and in the electrolyte herein described.

All of these ingredients being completely mobile liquids lend themselves to mixing under the most favorable conditions. In practice, they repose in closed receptacles and are preferably transferred therefrom to the mixing vessel by means of pumps and closed circuits, so that their mixing can be accomplished in the desired proportions without subjecting them to undesirable atmospheres. The mixtures are therefore accomplished without contamination with moisture, and under conditions that forestall evaporation of any of the constituents.

An electrolyte of outstanding high quality is formed by the reaction product consisting of 90 per cent by weight of either diethanolamine or triethanolamine and 10 per cent glacial acetic acid, in each instance of which there is produced a homogeneous clear and completely mobile liquid substance, that is very suitable for the impregnation of paper or absorbent spacer built electrolytic condensers. An electrolyte of the reaction product has a moderately basic reaction, but can be readily neutralized by increasing the glacial acetic acid proportions. The most suitable specific resistance is about 1,000 to 12,000 ohms per cubic centimeter at a temperature of about 85° F., although the specific resistance may vary considerably, depending to a large extent on the water content.

An outstanding feature of the electrolyte resulting from the reaction of glacial acetic acid upon either diethanolamine or triethanolamine, is the remarkable recuperative characteristic imparted to the condenser. As an example, an electrolytic condenser having as its electrolyte one of these reaction products, may be subjected to accelerated breakdown tests, by continuously applying an alternating current of 110 volts 60 cycles until the cell is brought to the breakdown point, or until it starts smoking intensively. If the current is now discontinued, and the cell is allowed to cool off, it will completely recover with substantially its initial capacity and power factor. Repeated subjection of the condenser unit to similar breakdown tests, or until it successively starts smoking intensively, will be followed in each instance after cooling with a like recovery. Similar overload conditions occur sometimes with condensers used for starting of motors, and this is an instance in which the recuperative properties of the condenser prove to be then of particularly great value.

Among the prior art developments of electrolytes there are many that have been attributed with considerable success. One such of those is characterized by an admixture of glycerol and a borate. Ordinarily, an electrolytic condenser characterized as a glycerine-borate electrolyte type, loses much of its capacity, and manifests in a greatly increased power factor when subjected to such severe tests, and almost always fails in its recuperative characteristics. This is at least partly due to the gumming of the glycerine-borate electrolyte, under heat generated during the test. The reaction product of an amine and acetic acid does not indicate that tendency of gumming under heat, which explains to a large extent its outstanding recuperative characteristic.

The advantages of using as an electrolyte for electrolytic condensers, the liquid reaction product of a liquid acid, practically free from water, like glacial acetic acid, or acetic anhydride and a liquid amine, like diethanolamine or triethanolamine are many. Among those advantages the principal ones are as follows:

(1) The handling of the liquid ingredients is easier and more convenient than the handling of solids like boric acid, the various borates, acetates etc. In particular, the charging of the tanks with liquids is much more convenient as the constituents can be handled by using pumps and flow meters. The use of pumps in handling the constituents as well as the reaction product, also minimizes their contamination with moisture which may otherwise be absorbed from the air.

(2) The amines and glacial acetic acids both being liquids and reacting rather vigorously with each other with the evolution of heat do not necessitate external heating and require practically no agitation. When solid ingredients are used, like boric acid and the borates, prolonged heating and agitation are required for their dissolving.

(3) The acidity of the resulting electrolyte, or of the reaction product, can be conveniently and readily adjusted by simply varying the proportions of the two ingredients, one of which is acid and the other basic. The electrolyte can be easily made neutral in the same manner. The electrolytes most commonly used heretofore in the absorbent spacer electrolytic condensers comprised borates dissolved in glycerine or glycol. The reaction of the solution in that case is rather strongly acid, which is not always desirable and which may enhance corrosion and deterioration of the various component parts of the condenser. Neutralization of this electrolyte is rather complicated because it usually entails the introduction of water, as when ammonium hydroxide is added to the electrolyte solution. The subsequent elimination of the water by evaporation complicates the process and is apt to upset the proportions of the constituents since some of them will escape along with the water.

(4) The conductivity of the electrolyte, or reaction product, can be readily regulated. While either glacial acetic acid or an amine alone have a very high resistance the reaction product of the acid and the amine is by far more conductive. The desired conductivity can be obtained by varying the proportions of the mixed ingredients and to a certain extent the minute quantities of water present in the electrolyte.

(5) The reaction products of glacial acetic acid and the various amines, within a wide ranged proportion, are clear, homogeneous, fluid liquids, without any tendency to throwing down precipitates. When used as an electrolyte in condensers the reaction products insure the complete distribution of a stable and uniform medium over all the surfaces of the active electrodes, which is beneficial for efficient operation of the apparatus and contributes to its long life. The reaction product being a fluid electrolyte, it also facilitates the impregnation of prewound absorbent spacer type condensers.

(6) The glacial acetic acid or the acetic anhydride being practically free from water simplifies the preparation of the electrolyte, since heating for the purpose of evaporation of water from the electrolyte is not necessary. Electrolytes of the prior art, such as the various borates (borax, ammonium pentaborate etc.) in conjunction with glycerine or with glycols, comprise a very substantial percentage of water of crystallization. As this water of crystallization is undesirable it becomes necessary to remove it by evaporation and that complicates the process of manufacturing very markedly, as it is accompanied by an uncontrollable loss of some of the other constituents of the electrolyte.

(7) The various amines can be readily mixed, thus affording the simple method of regulating certain properties of the electrolyte, like viscosity, conductivity, boiling point, freezing point, etc. As an example, the addition of monoethanolamine to diethanolamine or triethanolamine, when used in conjunction with acetic acid, makes the electrolyte more fluid. For best results the viscosity and conductivity of the electrolyte, like its other properties, are adaptable to the particular type of condenser in which the electrolyte is to be used. As an example, spacers of low absorbency require a more fluid electrolyte. High voltage condensers, ordinarily, should have an electrolyte of higher specific resistance.

(8) The amines possess good wetting properties for textiles, papers, fabrics, etc. Therefore, an electrolyte comprising such ingredients as characterize these reaction products, penetrates readily within the pores and interstices of the condenser spacer and thus secures perfect impregnation.

While the embodiment of the present invention as herein disclosed, constitutes a preferred form, it is to be understood that other forms might be adopted, all coming within the scope of the claims which follow.

What is claimed is as follows:

1. As a non-aqueous electrolyte of relatively high fluidity for an electrolytic cell, the combination including the reaction product of an amine, and glacial acetic acid, said reaction product having moderately basic reaction.

2. As a non-aqueous electrolyte of relatively high fluidity for an electrolytic cell, the combination including as ingredients an amine of the secondary class and glacial acetic acid, said amine ingredient being in excess of the said acid.

3. As a non-aqueous electrolyte of relatively high fluidity for an electrolytic cell, the combination including as ingredients an amine of the tertiary class and glacial acetic acid, said amine ingredient being in excess of the said acid.

4. A non-aqueous electrolyte of relatively high fluidity for an electrolytic cell, comprising the reaction product resulting from a mixture of the ethanolamines and glacial acetic acid.

5. The method of preparing a non-aqueous electrolyte of relatively high fluidity for electrolytic cells, comprising the steps of admixing an ethanolamine of at least the secondary class with glacial acetic acid, and thence controlling the viscosity of the reaction product by adding an ethanolamine of the primary class.

6. The method of preparing a non-aqueous electrolyte of relatively high fluidity for electrolytic cells, comprising the steps of admixing diethanolamine with glacial acetic acid, and thence regulating the viscosity of the reaction product by addition of monoethanolamine.

7. An electrolyte for electrolytic condensers, comprising the reaction product of an amine and an acid, and the addition of diacetone alcohol for regulating the viscosity, for stabilizing the capacity and power factor of the condenser, and for improving its life and breakdown characteristics.

8. The method of using diacetone alcohol in conjunction with the reaction product of an amine and an acid, for the purpose of impregnating porous spacer built electrolytic cells, comprising the steps of soaking the cells in diacetone alcohol prior to their impregnation in the electrolyte, draining the soaked cells, and then impregnating them in an amine-acid electrolyte.

9. A non-aqueous electrolyte of relatively high fluidity for an electrolytic cell, comprising the non-aqueous reaction product resulting from the admixture of an ethanolamine and glacial acetic acid, said reaction product having a moderately basic reaction.

10. An electrolyte for electrolytic condensers comprising the reaction products of an amine and glacial acetic acid, and the addition of diacetone alcohol for regulating the viscosity, for stabilizing the capacity and power factor of the condenser and for improving its life and breakdown characteristics.

11. The method of using diacetone alcohol in conjunction with the reaction products of an amine and glacial acetic acid for the purpose of impregnating porous spacer built electrolytic cells, comprising the steps of soaking the cells in diacetone solution prior to their impregnation in the electrolyte, draining the cells, and then impregnating them in an amine-glacial acetic acid electrolyte.

12. An electrolyte for electrolytic condensers comprising, an amine derivative of acetic acid having added thereto diacetone alcohol, said diacetone alcohol being added for regulating the viscosity for stabilizing the capacity and power factor of the condenser, and for improving its life and breakdown characteristics.

ALEXANDER M. GEORGIEV.